United States Patent
Mayhew

(10) Patent No.: US 8,483,864 B2
(45) Date of Patent: Jul. 9, 2013

(54) STAGE EFFECTS CONSOLE FOR STAGE CONTROLLING SYSTEM

(75) Inventor: Rusty Mayhew, New Windsor, NY (US)

(73) Assignee: Production Resource Group LLC, New Windsor, NY (US)

( * ) Notice: Subject to any disclaimer, the term of this patent is extended or adjusted under 35 U.S.C. 154(b) by 307 days.

(21) Appl. No.: 12/796,243

(22) Filed: Jun. 8, 2010

(65) Prior Publication Data

US 2010/0324703 A1 Dec. 23, 2010

Related U.S. Application Data

(60) Provisional application No. 61/218,927, filed on Jun. 20, 2009.

(51) Int. Cl.
*G05B 15/00* (2006.01)
*A63J 1/00* (2006.01)

(52) U.S. Cl.
CPC .......................................... *A63J 1/00* (2013.01)
USPC .......................................... 700/174; 717/104

(58) Field of Classification Search
CPC ....................................................... A63J 1/00
USPC 700/56, 79, 65, 86, 87, 90, 174; 318/568.11, 318/568.13, 560, 562; 362/286; 315/316; 715/763; 717/104, 137
See application file for complete search history.

(56) References Cited

U.S. PATENT DOCUMENTS

| | | | | |
|---|---|---|---|---|
| 5,414,328 A * | 5/1995 | Hunt et al. | ..................... | 315/316 |
| 5,920,476 A * | 7/1999 | Hennessey et al. | ............. | 700/17 |
| 6,079,862 A * | 6/2000 | Kawashima et al. | ......... | 382/103 |
| 6,297,610 B1 * | 10/2001 | Bauer et al. | ................... | 318/562 |
| 6,385,493 B1 * | 5/2002 | Hennessey et al. | ............. | 700/65 |
| 6,529,853 B1 * | 3/2003 | Bauer | ........................... | 702/152 |
| 6,570,355 B2 * | 5/2003 | Morita et al. | ................. | 318/563 |
| 7,134,109 B2 * | 11/2006 | Hayles | ......................... | 716/102 |
| 7,725,874 B2 * | 5/2010 | Kornerup et al. | ............. | 717/105 |
| 7,904,194 B2 * | 3/2011 | Brown et al. | ................ | 700/174 |
| 8,294,835 B2 * | 10/2012 | Ichikawa | ...................... | 348/840 |
| 2006/0294505 A1 * | 12/2006 | Englehart | ..................... | 717/131 |
| 2007/0191966 A1 * | 8/2007 | Fisher et al. | ..................... | 700/1 |
| 2008/0040703 A1 * | 2/2008 | Englehart | ..................... | 717/104 |

* cited by examiner

*Primary Examiner* — Dave Robertson
(74) *Attorney, Agent, or Firm* — Law Office of Scott C. Harris, Inc.

(57) ABSTRACT

A controlling console for moving elements such as trusses and winches. A console body has a display screen, and a processor which is programmed to produce an output screen on the display screen which accepts controls for controlling at least one movable device. The output screen includes a plurality of different logical blocks which are connected together. Values and conditions such as true, false, rising edge or error can be entered. The console arranges this into a flow arrangement.

13 Claims, 4 Drawing Sheets

US 8,483,864 B2

STAGE EFFECTS CONSOLE FOR STAGE CONTROLLING SYSTEM

This application claims priority from provisional application No. 61/218,927, filed Jun. 20, 2009, the entire contents of which are herewith incorporated by reference.

BACKGROUND

Today's lighting systems often include multiple different pieces of equipment which are connected together in a number of different ways. For example, a stage lighting system may include lights and props, a number of trusses, winches, and other devices which operate together in a specified way.

Many of these devices are mounted off the ground. Consequently, safety is very important. Moreover, many of these devices, such as trusses and other such devices, are moveable using remote controls to effect the movement.

SUMMARY

The present application describes a controller, e.g., a console which can be used to control the position of these stage parts, e.g., lights, trusses, winches, etc. The console allows defining sets of rules about how to and when to control the movement of the various items.

DETAILED DESCRIPTION

Figure 1:
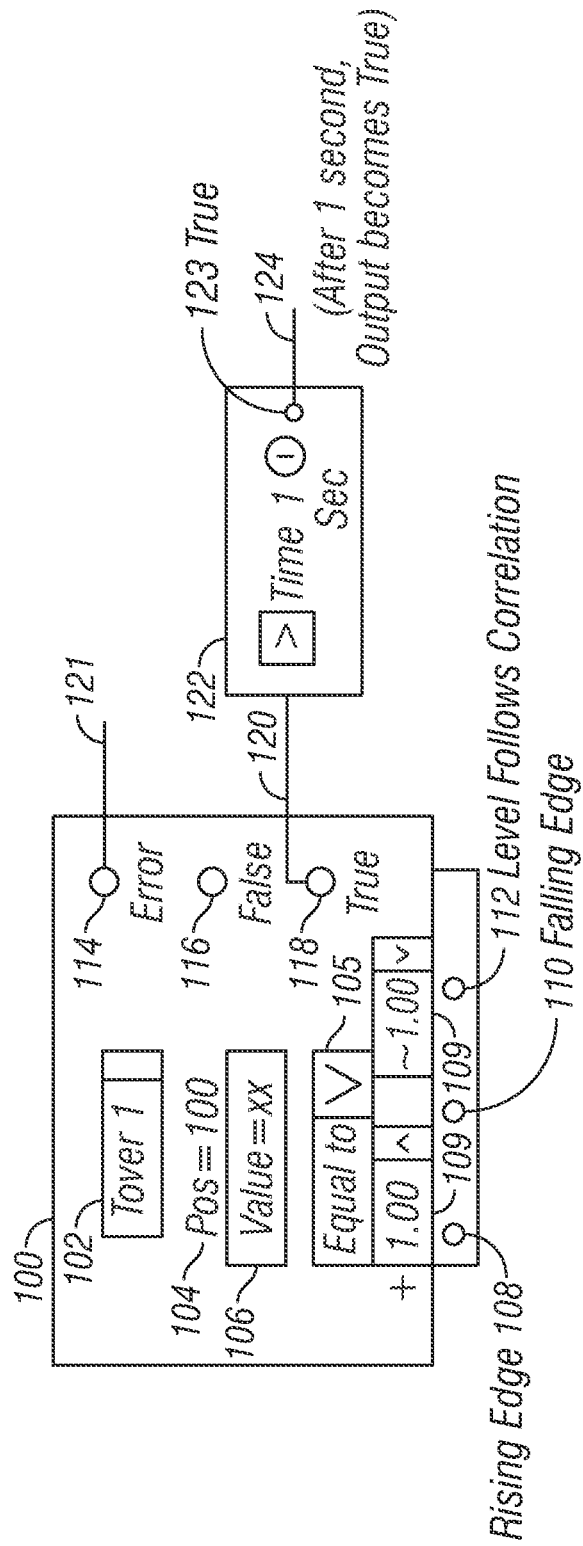
FIG. 1 shows a basic console control abstraction.

FIG. 1 shows the basic controls enabled by the console system. A screen 100 includes a number of selectable parts. Each part, such as 102, can be associated with a moveable device and set parameters for the device. The part in FIG. 1 is shown as tower 1. The part can be formed to hold a device within a stage lighting environment. For example, these could be towers or truss pieces, or any device that is held by, moved by and/or controllable via a winch or other controllable device.

For each selected device, there can be a parameter 104, here "position" or "pos", so that the position of the tower is controlled. The position is selected as 104; and the value of the position is shown as 106.

The parameter can be an "interlock" in one embodiment that can prevent or limit some action of the device. For example, the interlock can prevent a piece from coming within 6 feet of the floor, or prevent movement of the peace at a speed greater than 2 m/s. The parameters can be manually entered, or can be selected from a drop-down list of specific parameters. For example, when tower 102 is selected, the different parameters and interlocks that are associated with tower 102 can thereafter be selected.

In one embodiment, a device can be instructed to publish its position and/or speed, location and/or velocity as 104. In the shown example, for example, the tower 102 shows its position 104 causes the system to show its speed or velocity.

Each interlock and/or parameter can be controlled. For each of the items, for example, different parameters can be selected, such as position as in 104.

The parameter can also be used as part of a condition. FIG. 1 shows conditions including error at 114, false at 116, or true at 118. The parameter can be used as part of a relation, as shown as rising edge 108, falling edge 110, or level output following correlation 112. Any of these are selected graphically, by connecting to a graphical value indicative of the relation or condition. For example, in the figure on the drawing, a set of values is selected, tower one is selected with its position being 100, the equal to operator, and the true relationship at 118. This creates a relationship that when tower one is equal to position 100, the output 120 becomes active. The user can also select false, so that when tower 1's position is not equal to 100, a different output gets selected. For example, by connecting to the error line 114, an action can be taken on an error. That action could include, for an example, "engage all emergency brakes". By selecting among this set of conditions as shown in FIG. 1, an output 120 is created which represents tower 1 having a position value of 100, when true at 118, the system advances through position 120. This is the first of a set of conditions.

The output at condition 120 can be attached to another control box 122. This control box 122 may be the same as control box 100, or may be different. The control box 122 is shown as a set for creating a time delay. For example, this shows a time delay of 1 second. This means that if the output 120 stays true as selected by condition 123 for a time of one second, then the flow progresses to the next output or condition 124.

Other controls can also be selected. A value match control, for example, may select values such as equal to, not equal to, greater than, less than, etc, referring to the value 106.

A resolution command 109 can also be provided, for example +/−1 one can be one of the different resolutions. Any other resolution can alternatively be selected.

The control 110 allows selecting each of a plurality of these values.

This allows stage visualization and control via logic levels and flows for things that happen on the stage. These can be movements of the different movable items on the stage.

Each control such as 100 can be a multipurpose box that can allow multiple different commands to be generated. For example, the control box 100 can have all of the functionality shown in FIG. 1, or alternatively can have a reduced set of functionality.

Figure 2:
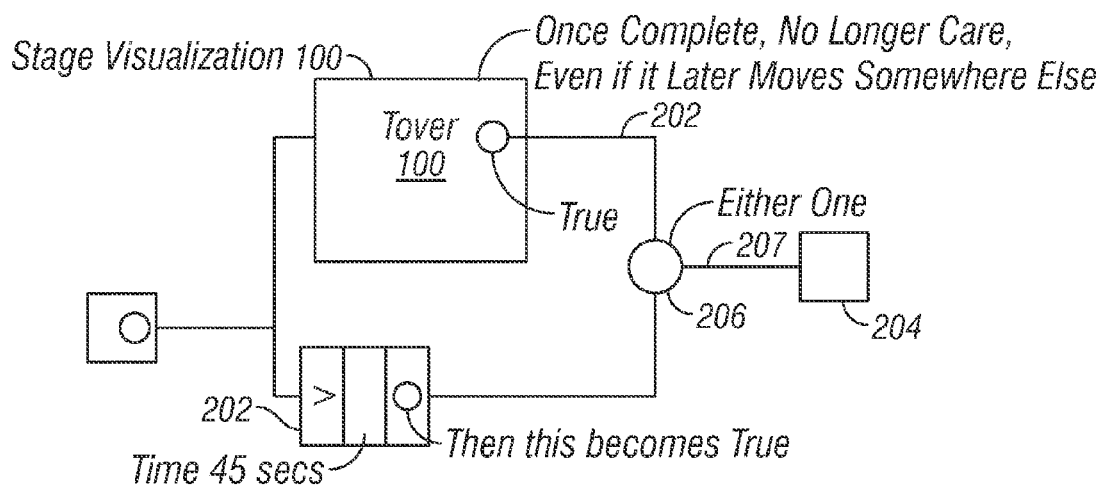
FIG. 2 shows a flow of console control.

FIG. 2 shows a general layout of how the different controls can be interconnected. Each control box such as 100 can represent an operation. The control box 100 may represent the same information as in the control box 100 in FIG. 1. This operation is part of the overall stage visualization. Once the operation 100 is complete, the system moves on to the next action. Here, the next action at 206 can be an "or" operator. Another control box 280 may be a time control box similar to that in 122. This time control box is sent for 45 seconds. The output of the control box 208 also is sent to the or operator 206. If either the control box 100 becomes true or the control box 208 becomes true, then the output 207 of the or operator 206 becomes active.

Parallel paths are also possible, so that in FIG. 1, output 120 may represent the operation when this becomes true, but output 121 represents the error output that may cause a halt and/or emergency brakes.

Therefore, in FIG. 2, the box 100 represents the tower reaching its position=100, while the time box 208 represents a time of 45 seconds becoming true. If either the tower reaches position=100, or if 45 seconds elapses (at 208), then the "OR" function 206, progresses to the next step 204. This set of rules therefore has the effect of moving on to step 204 once the tower reaches its position or when 45 seconds has elapsed even if the tower does not reach its position.

This allows creating logic to condition on certain actions as a series of rules. These rules can be any rules having to do with anything that occurs in a moving stage environment. Moreover, each of the logic boxes may be graphically created.

In this way, a series of rules for movement of stage complements can be graphically created, and nested in the way that allows operations to be carried out in the desired way.

Any of these rules can relate to, for example, movable stage items such as towers, winches and other movable items. Each item can be related to a "cue" caused by movement of different items. For any of the items, different limits or functions can be displayed related to the items.

Figure 3:
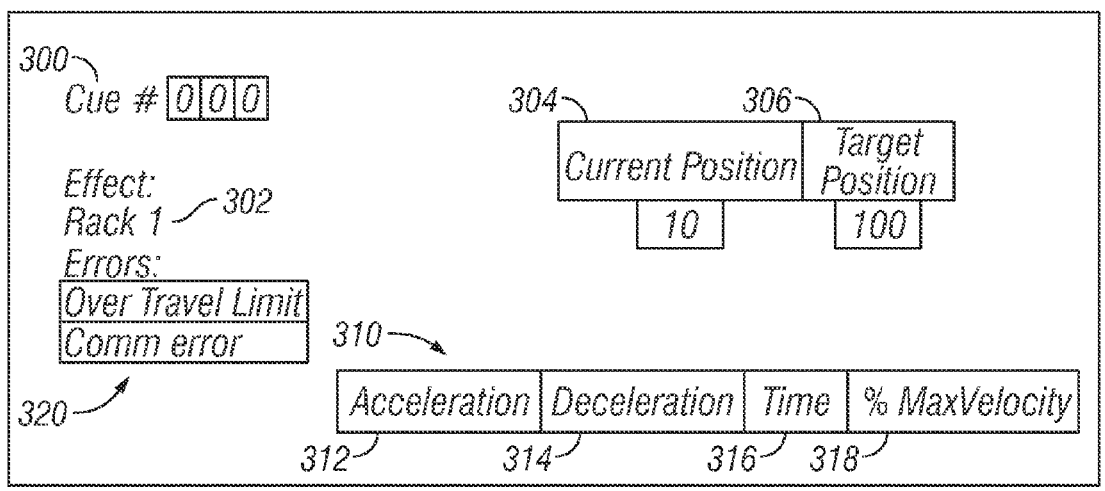
FIG. 3 shows the screen which can be used to form a console control module.

FIG. 3 illustrates a cue visualization function for a moving device which can be used as part of the controls 100. For example, one selection in 100 instead of selecting tower one could select a cue by its number. The cue creation module creates a cue number at 300, and allows selection of the item being moved, e.g., rack 1, at 302. A computing device automatically detects the current position at 304, and the target position is set at 306.

Movement parameters are set at 310. 310 allows selecting any of acceleration 312, deceleration 314, time 316, or percentage of maximum velocity 318. Any of these movement items at 310 can be chosen to calculate the real world parameters to get the item from the current position 304 to the target position 310. These set the way that the rack 1 is moved to its target position. A processor in the system automatically calculates the way in which movement will be carried out based on the entered value.

The system can also calculate faults, over travel limits, communication errors, and the like at 320. These faults may include setting values for example in 310 that are not possible, or faults of the movement itself.

The cues can be added as part of the items shown above, so that they can be conditional, and do not run until the condition is set.

Figure 4:
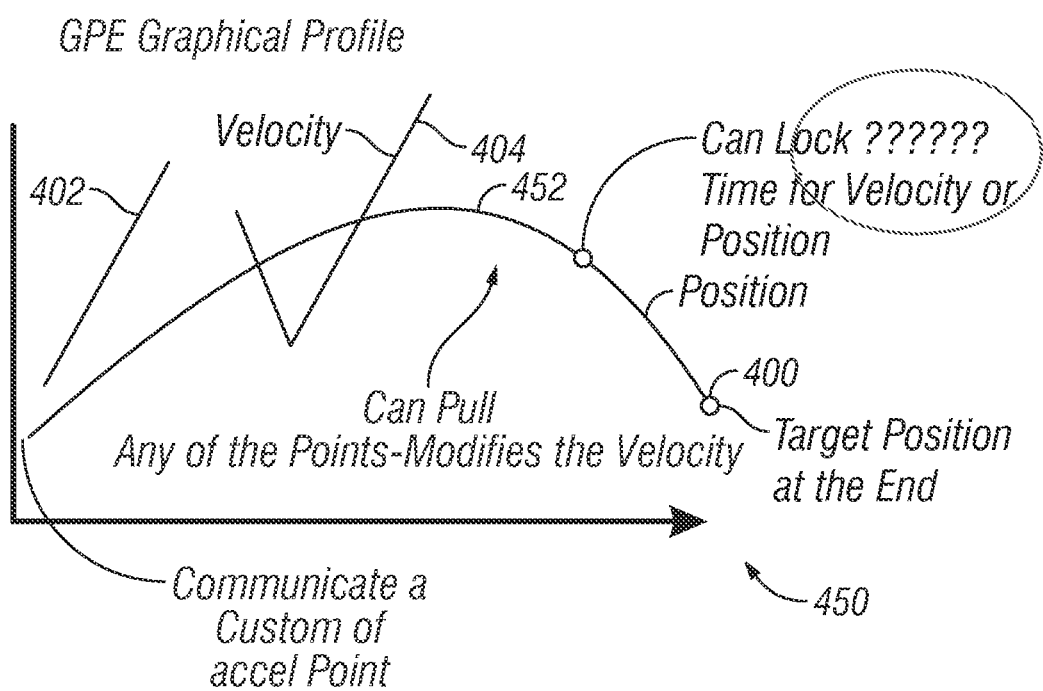
FIG. 4 shows a graphical profile which can be used according to the present system.

310 shows a textual based entry of data. Another embodiment uses a graphical profile such as shown in FIG. 4 in place of the item at 310.

The graphical profile can be a selection of the operation over time, where the x axis 450 is a time axis. In FIG. 4, the plot 452 can be position, and 400 shows the target position. Any and all the points in between can have their values set, including acceleration 402, velocity 404, or the like. At any point, the user can select an acceleration point, a velocity, lock against time, or position.

Figure 5:
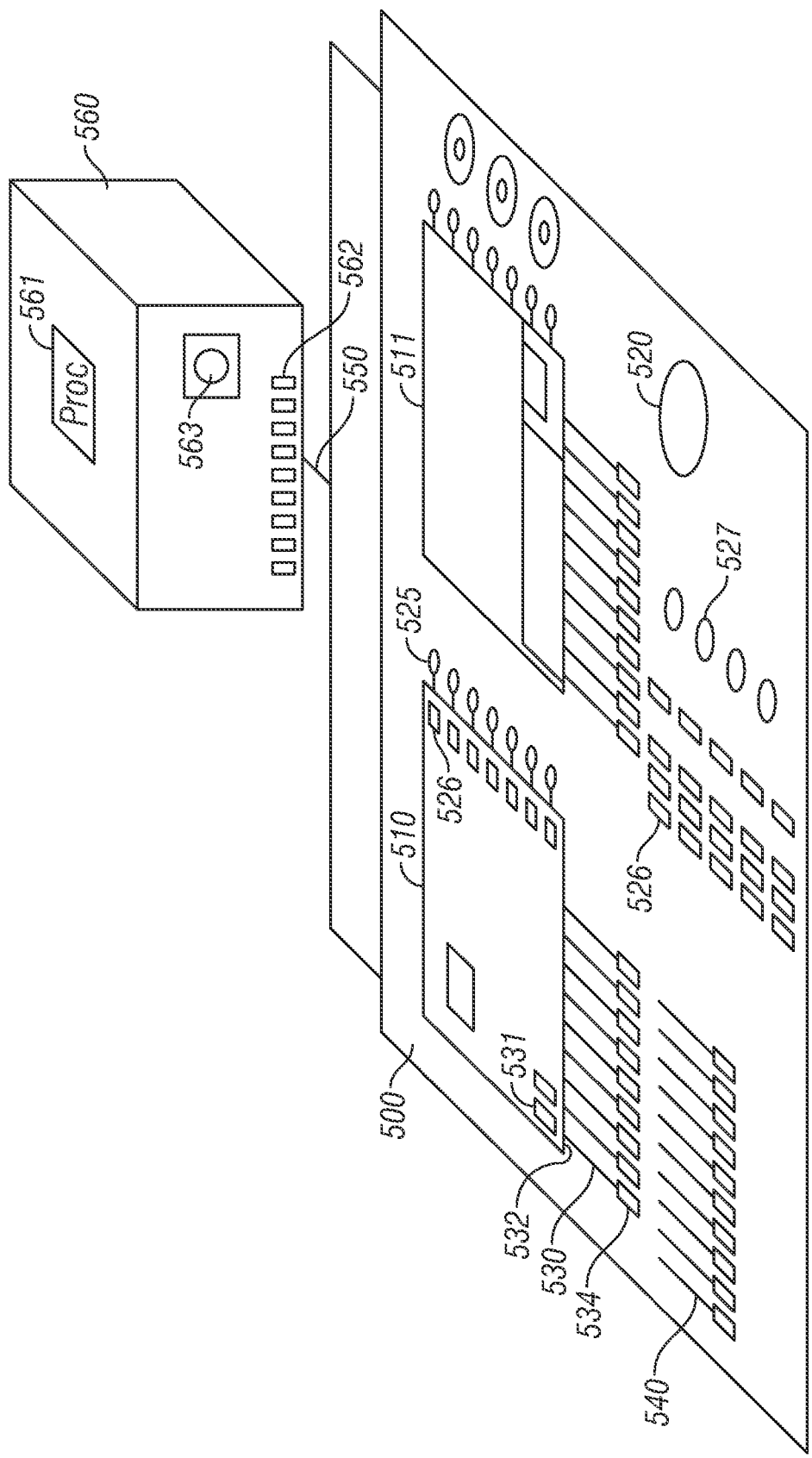
FIG. 5 shows an exemplary console which can be used according to the present system.

FIG. 5 illustrates the console 500 that can be used to enter any or all of these commands. The console 500 has displays 510, 511, each of which has selectable parts. The parts can be selected by trackball 520, or via an externally selectable mouse. There are also button banks 525, 526, where the button banks 525 are each respectively associated with commands such as 526 which appear on the screen. Encoders 527 each may also have selectable parts.

There are also slider controls 530, which can be used to control parameters 531 which may be displayed as associated with the screen. In addition, in the graphical embodiment of FIG. 4, the slider bank 530 can be used to pull the direction of any of the points in time, and or can be used to select these points. The sliders preferably are selectable between multiple different sections. When the slider is at the lowermost portion 534, it causes the slider to be in a forced off state. The slider at the uppermost section 532 is in a forced on state. Each of the sliders can be associated with a sub master bank 540. Any slider such as 531 can be made active, at which time, there are submasters that become active and are associated therewith. For example, the entire bank 540 can be associated as a sub master bank for the control 531 at any specific time. This can set a number of different levels for the sub master, and the levels can be shown on either of the screens 510, 511, or on any other screen.

The submasters can also be digital, for example, that is only selectable between on and off.

The console 500 is connected via a connection 552 the main controlling computer 560. The controlling computer 560 can use a processor 561 which is programmed according to the techniques described herein to carry out the functions described herein. The front panel of the computer 560 may have indicator lights 562, and may also have an emergency off switch 563 which forces automatic stopping of all controlled items.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other stage operated and operable devices can be controlled in this way including winches and movable trusses, and moving light holders.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A controlling console, comprising
a console body;
a display screen, mounted in said console body;
a processor which is programmed to produce an output screen on said display screen which accepts controls for controlling at least first and second movable stage items, said output screen including a plurality of different logical blocks which are connected together, where at least a first of said logical blocks represents said first movable stage item being controlled, at least one parameter of said item being controlled according to values entered into said first logical block, and according to at least one condition of said parameter, where when said first logical block defines a first condition of said first moveable stage item, said logical block advances to a second logical block, and where said second logical block represents said second stage items being controlled, and includes at least one parameter whose condition is to be met, and where said processor arranges said logical blocks into a flow arrangement, and causes said first and second movable stage items to be controlled according to conditions in said first and second logical blocks, wherein said at least one condition is a target position of said at least one movable stage items being controlled via one of said logical blocks, and where said at least one of said moveable stage items is controlled based on commands in said at least one of said logical blocks to move to said target position at a first percentage of its maximum velocity, where said first percentage is less than full velocity, and said first percentage is a parameter that is specified by a user as one of said controls.

2. The console as in claim 1, wherein at least one of said movable stage items is a winch.

3. A console as in claim 1, wherein said second logical block controls a time delay during which time delay said condition must remain true.

4. The console as in claim 1, wherein said at least one characteristic of the condition allows selection of all of true and false.

5. The console as in claim 1, wherein at least one condition of the parameter allows selection of all of rising edge and falling edge.

6. The console as in claim 1, wherein said output screen shows said first and second logical blocks, and a flow between said first and second logical blocks, and said processor allows changing the flow between said first and second logical blocks.

7. The console as in claim 1, wherein said at least one parameter includes acceleration or percentage of maximum velocity of the movable stage item.

8. A console as in claim 7, wherein when acceleration is entered, the processor calculates a movement profile based on said acceleration by an amount that does not exceed said acceleration, and when said percentage of maximum value is entered, the processor calculates the movement profile based on not exceeding said percentage of maximum value.

9. The console as in claim 1, further comprising a screen which shows a graphical profile showing said at least one condition.

10. The console as in claim 9, further comprising controls which allow modifying said profile graphically.

11. A method, comprising using a computer for: defining a first condition for a first movable device on a stage, wherein said first condition includes information about movement of said first movable device, and wherein said first condition includes an action when said first condition occurs, where said action includes a graphical box indicative of the condition, and a plurality of different output conditions, wherein at least one of said output conditions is true, where said one output condition produces an output when the action is true, another of said output conditions is false, and said another output condition produces said output condition when said output is false, and a third of said output conditions is other than true or false and produces an output when said output is other than true or false;

using said computer for defining a second condition for a second movable device on the stage, different than said first movable device; using said computer for graphically showing a connection between said first condition and said second condition; and taking an action as an output of said second condition, only after said first condition has been met, and said second condition has also been met, wherein at least one condition among said first and second position is a target position of said at least one movable stage items being controlled via one of said graphical boxes, and where said at least one of said moveable stage items is controlled by said computer to move to said target position at a first percentage of a maximum velocity of said at least one moveable stage item, where said first percentage is less than full velocity of said moveable stage item, and said first percentage is a parameter that is specified by a user.

12. The method as in claim 11 connecting an output of said first condition graphically to said second condition.

13. The method as in claim 12, further comprising changing said connection.

* * * * *